2,843,502
PROCESS OF COATING A FABRIC WITH POLY-TETRAFLUOROETHYLENE, THE PRODUCT THEREOF AND THE COATING COMPOSITION THEREFOR

Robert E. Fay, Jr., Highland Mills, N. Y., assignor to E. I. du Pont de Nemours and Company, Wilmington, Del., a corporation of Delaware No Drawing. Application February 17, 1954
Serial No. 411,021

14 Claims. (Cl. 117—65)

This invention relates to polytetrafluoroethylene aqueous coating compositions and substrates coated therewith.

Polytetrafluoroethylene is a polymeric film-forming material which has several outstanding properties, such as insolubility in all known solvents, resistance to very high temperatures which adversely affect all known organic film-forming substances, resistance to abrasion, unusual electrical properties; e. g. high dielectric strength, high insulation resistance and extremely low power factor.

In the manufacture of polytetrafluoroethylene the polymerization is carried out in an aqueous medium in the presence of stabilizers or wetting agents to form dispersions of the polymer in the aqueous medium. The aqueous dispersion or suspensoid as supplied to the trade contains about 1–10% of a dispersing agent based on the weight of polytetrafluoroethylene. Due to the insolubility of polytetrafluoroethylene it is usually applied to substrates in the form of the aqueous dispersion or suspensoid and subsequently heated to fuse or sinter the polymeric particles.

One commercial method of impregnating and/or coating glass fabrics with an aqueous dispersion of polytetrafluoroethylene involves dipping the glass fabric in a bath of the aqueous dispersion of polytetrafluoroethylene and then passing the wet fabric upwardly through a heat zone to dry and heat the coating up to at least its fusion temperature of 621° F. Due to high cost of polytetrafluoroethylene it is desirable to add inert fillers such as mica, talc, silica, titania, alumina, cryolite, graphite, etc., to the aqueous dispersions for economic advantage. One of the major problems in coating glass fabrics with the filled polytetrafluoroethylene compositions is that subsequent dip coats applied over the first fused coat do not wet uniformly and result in an uneven coating. A further disadvantage is that the first dip coat does not close or uniformly bridge the interstices of certain woven glass fabrics commonly used for electrical insulations. When the prior art polytetrafluoroethylene coated glass fabrics are employed for electrical insulation failure usually occurs through the interstices of the fabric.

A primary object of this invention is the provision of a polytetrafluoroethylene coating composition which overcomes many of the disadvantages of prior art polytetrafluoroethylene coating compositions. Further objects are the provision of filled or unfilled aqueous dispersions of polytetrafluoroethylene which wet and spread uniformly on a previously fused polytetrafluoroethylene surface. A still further object is the provision of an aqueous polytetrafluoroethylene coating composition (filled or unfilled) with improved bridging properties when applied to open weave fabrics. A still further object is the provision of a completely bridged glass fabric with less polytetrafluoroethylene coating than is possible with the prior art polytetrafluoroethylene compositions.

The primary object of this invention is accomplished by incorporating in an aqueous dispersion of polytetrafluoroethylene containing a primary wetting agent, a small proportion of an ancillary wetting agent comprising a water-soluble ammonium salt of an alkyl substituted benzene sulfonic acid having the following empirical formula:

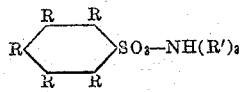

where R is a member of the group consisting of hydrogen and alkyl radicals, at least one R being an alkyl radical, the sum of the carbon atoms in said alkyl radicals being 8 to 22, and where R' is a member of the group consisting of hydrogen, 1 to 8 carbon atom alkyl radicals and 1 to 4 carbon atom monohydroxy alkyl radicals, and the sum of the carbon atoms in the R' radicals is 1 to 12. The primary wetting agent is incorporated in the polytetrafluoroethylene aqueous dispersion during or immediately following the polymerization of polytetrafluoroethylene and is chemically different than the ancillary wetting agent. Suitable primary wetting agents include an alkyl aryl polyglycol ether or the sodium salt of the sulfuric acid ester of a mixture of long chain alcohols, predominantly lauryl alcohol. Other objects of this invention are accomplished by applying the aqueous polytetrafluoroethylene dispersion containing the two wetting agents to a substrate, particularly open weave glass fabric, and subjecting the coated substrate to sufficient heat to fuse or sinter the coating. Additional objects are accomplished by incorporating the ancillary wetting agent together with an inert filler in an aqueous dispersion of polytetrafluoroethylene containing the primary wetting agent and applying the resulting composition to a substrate, such as, e. g. glass fabric.

The starting material in preparing the compositions of this invention is an aqueous dispersion of polytetrafluoroethylene produced in accordance with U. S. Patent 2,559,752 and containing a primary wetting agent, introduced by the polymer manufacturer immediately after the polymerization process to prevent coagulation and settling of the polymer from the aqueous suspension. Suitable primary wetting agents useful in this invention include a polyethylene glycol ether of an alkylated phenol and the sodium salt of the sulfuric acid ester of a mixture of long chain alcohols, predominantly lauryl alcohol.

Polytetrafluoroethylene aqueous dispersions, as supplied by the polymer manufacturer, contain 30–70% polytetrafluoroethylene, based on total composition, and 1–10% of a primary wetting agent, based on the weight of polytetrafluoroethylene. When more than about 1% of the ancillary wetting agent is added to concentrated polytetrafluoroethylene aqueous dispersions (60–70% polytetrafluoroethylene), containing the primary wetting agent, the compositions show a thixotropic behavior. As much as about 10% of the ancillary wetting agent may be added to more dilute polytetrafluoroethylene aqueous dispersions (30–40% polytetrafluoroethylene) before the thixotropic behavior is exhibited. Thixotropy makes dip coat application of the compositions of this invention to substrates difficult due to uneven spreading, excessive pickup and entrapment of air, resulting in a porous coating when dried and fused. Compositions which are thixotropic may be applied to substrates by other means, such as, e. g., doctor knife or doctor roller.

Compositions containing up to about 10% of the ancillary wetting agent, based on the weight of polytetrafluoroethylene, are suitable for coating glass fabrics to accomplish essentially complete bridging of the interstices in a minimum amount of coating. Compositions containing below .4% of the ancillary wetting agent, based on the weight of polytetrafluoroethylene, show very little, if any, improvement in bridging and flow-back properties. By the term "flow-back" is meant that property of the composition to spread or wet uniformly across the width of the fabric being coated as it emerges vertically from the aqueous dispersion. As the fabric emerges vertically from the aqueous dispersion, it carries an excess of the composition on its surface which flows downwardly, i. e., counter to the movement of the fabric. In the case of the compositions of this invention the excess composition picked up by the fabric as it emerges vertically from the impregnating bath rises to the same height on both sides and forms a straight horizontal line across the width of the fabric, thus depositing a uniform coat.

The following specific examples illustrate certain preferred embodiments of the invention and are given for illustration and not limitation. Unless otherwise specified the percentages and parts figures throughout the specification and claims are expressed on a weight basis.

EXAMPLE I

A standard woven glass fabric identified as ECC-11-108 "Fiberglas" having the following specifications:

Thickness—mils _____ 2
Thread count per inch (warp x filler) _____ 60 x 47
Yarn size _____ 900½
Ounces per square yd _____ 1.43 was given one dip coat of the following composition:

Coating composition

| | Parts by wt. | |
|---|---|---|
| Polytetrafluoroethylene Aqueous Suspensoid: | | |
| Polytetrafluoroethylene | 60.0 | |
| Primary dispersing agent—octyl phenyl polyglycol ether | 3.6 | 83.3 |
| Water | 36.4 | |
| | 100.0 | |
| Ancillary dispersing agent—butyl amine salt of dodecyl benzene sulfonic acid | | .2 |
| Water | | 16.5 |
| | | 100.0 |

The amount of ancillary wetting agent present in the above formula corresponds to .4%, based on the weight of polytetrafluoroethylene.

The glass fabric was passed through the above composition at a rate of 1½ yards per minute. It emerged from the composition vertically and then passed upwardly through a gradated heat zone where the coating was first dried and then heated to at least 621° F. to fuse or sinter it. The excess coating composition picked up and carried out of the impregnating bath by the glass fabric flowed back uniformly across the width on both sides.

The glass fabric was uniformly coated and the interstices were essentially completely bridged with only 1.52 ounces of dry coating per square yard. The average dielectric strength was 400 volts per mil thickness.

When the above example was repeated with a coating composition identical to that above except it contained no ancillary wetting agent, the interstices were not bridged with essentially the same coating weight and the average dielectric strength of the coated glass fabric was essentially that of air, i. e., less than 200 volts per mil thickness.

In another modification of the above example the primary wetting agent in the polytetrafluoroethylene suspensoid was replaced with an equivalent amount of the ancillary wetting agent and the interstices of the fabric were not bridged with essentially the same coating weight and the average dielectric strength of the coated glass fabric was essentially that of air.

EXAMPLE II

In another example, differing only from Example I in that the coating composition contained 1.0% of the butyl amine salt of dodecyl benzene sulfonic acid, based on the weight of polytetrafluoroethylene, in place of the .4%, the fabric was completely bridged with only 1.95 ounces of dry coating per square yard. The average dielectric strength was 404 volts per mil thickness. The location of the dielectric failures was equally distributed between the filled or bridged interstices of the fabric and the coated glass yarns or threads.

EXAMPLE III

The glass fabric identified in Example I was dip coated in the same manner as described in Example I with the following talc filled polytetrafluoroethylene coating composition:

Coating composition

| | Parts by wt. | |
|---|---|---|
| Polytetrafluoroethylene aqueous suspensoid: | | |
| Polytetrafluoroethylene | 60.0 | |
| Primary dispersing agent—same as Example I | 4.8 | 61.93 |
| Water | 35.2 | |
| | 100.0 | |
| Ancillary dispersing agent—same as Example I | | .37 |
| Talc grind: | | |
| Talc | 45.0 | |
| Water | 54.0 | 20.40 |
| Octyl phenyl polyglycol ether | 1.0 | |
| | 100.0 | |
| Water | | 17.30 |
| | | 100.00 |

The amount of ancillary wetting agent in the above composition is 1.0%, based on the weight of polytetrafluoroethylene.

The glass fabric was uniformly coated and the interstices were essentially completely bridged with only 1 dip coat, depositing 2.0 ounces of dry coating per square yard. The average dielectric strength was 544 volts per mil thickness. The electrical failures in the dielectric test were equally distributed between the filled or bridged interstices of the fabric and the coated glass yarns and threads.

EXAMPLE IV

The glass fabric identified in Example I was dip coated with the following composition:

Coating composition

| | Parts by wt. | |
|---|---|---|
| Polytetrafluoroethylene aqueous suspensoid: | | |
| Polytetrafluoroethylene | 45.0 | |
| Primary dispersing agent—same as Example I | 4.5 | 79.2 |
| Water | 50.5 | |
| | 100.0 | |
| Ancillary wetting agent—same as Example I | | 1.0 |
| Talc grind: | | |
| Talc | 45.0 | |
| Water | 54.0 | 19.8 |
| Octyl phenyl polyglycol ether | 1.0 | |
| | 100.0 | |
| | | 100.0 |

The amount of ancillary wetting agent in the above formula corresponds to 2.8%, based on the weight of the polytetrafluoroethylene. The amount of primary dispersing agent in the suspensoid is 10% based on the weight of the polytetrafluoroethylene.

The ECC-11-108 "Fiberglas" was given two dip coats in the above composition at a rate of 1¾ yards per minute. The coating was dried and fused immediately after each dip coat in the same manner as described in Example I. The fabric emerged from the coating composition vertically and then passed upwardly through a gradated heat zone where the coating was first dried and then heated to at least 621° F. to fuse or sinter the polytetrafluoroethylene particles after each dip coat. The excess coating composition picked up and carried out of the impregnating bath by the glass fabric flowed back uniformly across the width on both sides during both dip coats. There were about 1.2 ounces per square yard of dry coating deposited by the first dip coat and 1.0 ounce per square yard deposited by the second dip coat, for a total of about 2.2 ounces per square yard for the two dip coats. The average dielectric strength of the dry coated glass fabric was 694 volts per mil thickness. The thickness of the coated fabric was 2.9 mils. The interstices of the glass cloth were essentially all filled.

The above example was repeated in which the ancillary wetting agent was omitted from the coating composition. The second coat did not wet the previously fused coat and essentially no coating was deposited by the second dip coat and the interstices of the glass cloth were not bridged or filled and the average dielectric strength was essentially that of air.

EXAMPLE V

A standard woven glass fabric identified as ECC-11-112 "Fiberglas" having the following specifications:

| | |
|---|---|
| Thickness—mils | 3 |
| Thread count per inch (warp x filter) | 40 x 39 |
| Yarn size | 450½ |
| Ounces per square yard | 2.09 | was given two dip coats of the following composition:

Coating composition

| | Parts by wt. |
|---|---|
| Polytetrafluoroethylene aqueous suspensoid: | |
|   Polytetrafluoroethylene | 60.0 |
|   Primary wetting agent—same as Example I | 3.6 } 83.20 |
|   Water | 36.4 |
| | 100.0 |
| Ancillary wetting agent—same as Example I | .35 |
| Water | 16.45 |
| | 100.00 |

The amount of ancillary wetting agent in the above formula corresponds to .7%, based on the weight of polytetrafluoroethylene.

The glass fabric was passed through the above coating composition at a rate of two yards per minute and as it emerged vertically from the coating composition the excess coating flowed back uniformly on both sides. The coated fabric was passed upwardly through a gradated heat zone to expel the volatile portions of the coating composition and heat the coating to its fusion temperature, i. e. at least 621° F. All the interstices of the glass fabric were essentially bridged with only 4.4 ounces of dry coating per square yard. The average dielectric strength was 674 volts per mil.

The above example was repeated, except the ancillary wetting agent was omitted from the coating composition. The interstices of the glass fabric were not bridged and the dielectric strength was essentially that of air.

EXAMPLE VI

The ECC-11-108 "Fiberglas" glass fabric employed in Example I was given two dip coats in the following composition:

Coating composition

| | Parts by wt. |
|---|---|
| Polytetrafluoroethylene aqueous suspensoid: | |
|   Polytetrafluoroethylene | 60.0 |
|   Primary wetting agent—same as Example I | 3.6 } 58.23 |
|   Water | 36.4 |
| | 100.0 |
| Ancillary wetting agent—triethanol amine salt of dodecyl benzene sulfonic acid | .25 |
| Water | 41.52 |
| | 100.00 |

The amount of ancillary wetting agent in the above formula corresponds to .7%, based on the weight of the polytetrafluoroethylene.

The glass fabric was given two dip coats of the above composition in the same manner as the preceding example. The glass fabric was wet uniformly and there was uniform flow-back of the excess coating composition on both sides during each coat. The interstices of the glass fabric were essentially completely bridged in the two coats with only 1.68 ounces of dry coating per square yard. The average dielectric strength of the coated glass fabric was 548 volts per mil thickness.

When the above example was repeated using the butyl amine salt of dodecyl benzene sulfonic acid in place of the triethanol amine salt as the ancillary wetting agent, essentially the same results were obtained, i. e., the interstices of the fabric were essentially bridged by the two coats with only 1.70 ounces of dry coating per square yard and the average dielectric strength was 582 volts per mil thickness. The butyl amine salt of dodecyl benzene sulfonic acid and the triethanol amine salt of dodecyl benzene sulfonic acid are full equivalents for the purposes of this invention.

When the ancillary wetting agent was omitted from the above example the interstices were not bridged with two dip coats which deposited 1.64 ounces of dry coating per square yard and the average dielectric strength was essentially that of air.

EXAMPLE VII

The ECC-11-108 "Fiberglas" of Example I was given two dip coats of the following composition in the same manner as described in the preceding examples:

Coating composition

| | Parts by wt. |
|---|---|
| Polytetrafluoroethylene aqueous suspensoid: | |
|   Polytetrafluoroethylene | 60.0 |
|   Sodium salt of the sulfuric acid ester of a mixture of long chain alcohols, predominantly lauryl alcohol | 1.8 } 58.20 |
|   Water | 38.2 |
| | 100.0 |
| Ancillary wetting agent—same as Example I | .25 |
| Water | 41.55 |
| | 100.00 |

The amount of ancillary wetting agent in the above formula corresponds to .7% of the weight of polytetrafluoroethylene.

The flow-back of the excess coating composition picked up by the glass fabric was uniform on both sides during the application of both dip coats and there was uniform wetting of both sides of the fabric during the second dip coat applied over the previously fused first coat. The interstices of the glass fabric were essentially completely bridged by the two dip coats with only 1.8 ounces of dry coating per square yard.

When the above example was repeated without the ancillary wetting agent the first dip coat wet the fabric uniformly and a uniform coat corresponding to 1.0 ounce of dry coating per square yard was deposited but the interstices were not bridged or filled. The second dip coat did not wet the previously fused first coat and there was essentially no increase in weight of coating or number of interstices bridged or filled as a result of the second dip coat.

EXAMPLE VIII

The ECC-11-108 "Fiberglas" of Example I was given two dip coats of the following composition in the same manner as described in the preceding example:

Coating composition

| | Parts by wt. |
|---|---|
| Polytetrafluoroethylene aqueous suspensoid: | |
|   Polytetrafluoroethylene | 60.0 |
|   Primary wetting agent—same as Example I | 3.6 } 56.4 |
|   Water | 36.4 |
| | 100.0 |
| Ancillary dispersing agent—butyl amine salt of dodecyl benzene sulfonic acid | 3.4 |
| Water | 40.2 |
| | 100.0 |

The amount of ancillary wetting agent in the above composition corresponds to 10% of the weight of polytetrafluoroethylene.

The flow-back of the excess coating composition picked up by the glass fabric was uniform on both sides during the application of both dip coats, and there was uniform wetting of both sides of the fabric during the second dip coat applied over the previously fused first coat. The interstices of the glass fabric were essentially completely bridged by the two dip coats with only 2.0 ounces of dry coating per square yard.

The dielectric strength test in all the examples was carried out in accordance with the method identified as ASTM D149-44 using the short time test in air with ¼" electrode and a 60 cycle alternating current.

The electrical failure of insulation made from prior art polytetrafluoroethylene coated glass fabric generally occurs through the interstices of the fabric, i. e. between the fabric threads. With the products of this invention the breakdown of electrical insulation is equally distributed through the interstices and the coated threads, and the overall dielectric property is somewhat higher.

The ancillary wetting agents useful in this invention are the water-soluble ammonium salts of alkyl substituted benzene sulfonic acid. The alkyl substitution on the benzene ring may be on one or more carbon atoms and the sum of the carbon atoms of the alkyl groups is 8 to 22. A mono substitution of the 12 carbon atom alkyl group (dodecyl) on the benzene ring is preferred. The ammonium salts of the alkyl substituted benzene sulfonic acid includes the $NH_4$ salt, as well as the mono-, di- and tri-substituted ammonium salts in which one, two or three hydrogen atoms on the nitrogen atom may be replaced with a 1 to 8 carbon atom alkyl radical or a 1 to 4 carbon atom monohydroxy alkyl radical. The alkyl substituent on the substituted ammonia may be, e. g., methyl, ethyl, propyl, isopropyl, butyl, isobutyl, hexyl, cyclohexyl, or octyl. The monohydroxy alkyl substituent on the substituted ammonia may be derived from monohydroxy aliphatic alcohols, such as, e. g., ethyl, propyl, isopropyl, butyl and isobutyl. The monobutyl amine salt and the triethanol amine salt of the alkyl substituted benzene sulfonic acid are the preferred substituted ammonia compounds.

The specific examples of the coating compositions of this invention illustrate but two specific ancillary wetting agents; namely, butyl amine salt of dodecyl benzene sulfonic acid and triethanol amine salt of dodecyl benzene sulfonic acid. In the interest of avoiding undue repetition, examples of coating compositions employing every operable ancillary wetting agent have not been given. It is to be understood however that the ancillary wetting agents within the scope of the empirical formula given above may be substituted in like amount for those given in the specific examples of the coating composition.

In the preferred examples the coatings are applied by dipping the substrate to be coated into the impregnating or coating composition. In addition the coatings may be applied by doctor knife, doctor roller, reverse roller, and other techniques in the art of coating surfaces with liquid coating compositions. The coatings may be applied to one or both sides of the substrate to be coated.

In addition to the coating of fabrics for use as electrical, heat and chemical insulations, the compositions of this invention are also useful for coating heat resistant surfaces such as sheet metals, ceramics, woven metal fabrics such as, e. g. aluminum and cooper, and heat treated polyacrylonitrile fabrics. The coating compositions of this invention are also useful for coating substrates which have a decomposition temperature below the fusion temperature of polytetrafluoroethylene, such as, cotton, nylon, rayon and various synthetic resins, in which case the baking temperature must be below the decomposition temperature of the substrate.

The compositions of this invention are also useful as wire coatings and corrosion resistant coatings for metal tanks. The anti-stick properties of the fused coatings make them useful for coating bread pans, cookie sheets and muffin tins.

The primary advantage of this invention is the substantially complete bridging of open weave fabrics with less polytetrafluoroethylene coating composition than is possible with prior art polytetrafluoroethylene coatings. A further advantage is the provision of a filled aqueous polytetrafluoroethylene coating composition which will uniformly wet a previously fused polytetrafluoroethylene surface and deposit a uniform coat. A still further advantage is the improved dielectric strength of polytetrafluoroethylene coated glass fabrics having as little as 1.5 ounces of coating per square yard.

It is apparent that many widely different embodiments of this invention may be made without departing from the spirit and scope thereof and, therefore, it is not intended to be limited except as indicated in the appended claims.

I claim:

1. A coating composition comprising an aqueous suspension of polytetrafluoroethylene, 1% to 10% of a water-soluble primary wetting agent and .4% to 10% of an ancillary wetting agent, said percentages being based on the weight of polytetrafluoroethylene, said primary wetting agent being a member of the group consisting of (1) the sodium salt of the sulfuric acid ester of monohydric alcohols comprising predominantly lauryl alcohol and (2) octyl phenyl polyglycol ether, and said ancillary wetting agent being chemically different than said primary wetting agent and having the following empirical formula:

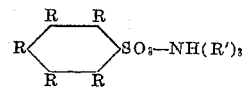

where R is a member of the group consisting of hydrogen and alkyl radicals, at least one R being an alkyl radical, the sum of the carbon atoms in said alkyl radicals being 8 to 22, and where R' is a member of the group consisting of hydrogen, 1 to 8 carbon atom alkyl radicals and 1 to 4 carbon atom monohydroxy alkyl radicals, and the sum of the carbon atoms in the R' radicals is 1 to 12.

2. The composition of claim 1 in which the primary wetting agent is the sodium salt of the sulfuric acid ester of a mixture of alcohols comprising predominantly lauryl alcohol.

3. The composition of claim 1 in which the primary wetting agent is octyl phenyl polyglycol ether.

4. The composition of claim 1 in which the ancillary wetting agent is the butyl amine salt of dodecyl benzene sulfonic acid.

5. The composition of claim 1 in which the ancillary wetting agent is the triethanolamine salt of dodecyl benzene sulfonic acid.

6. The composition of claim 1 in which the primary wetting agent is octyl phenyl polyglycol ether and the ancillary wetting agent is the butyl amine salt of dodecyl benzene sulfonic acid.

7. The process which comprises bridging the interstices of a woven fabric with the composition of claim 1 and heating the coating to at least 621° F., but below the decomposition temperature of the fabric.

8. The process of claim 7 in which the woven fabric is glass fabric.

9. The product of the process of claim 7.

10. The composition of claim 1 which contains an inert filler.

11. The composition of claim 10 in which the inert filler is talc.

12. The process which comprises bridging the interstices of a woven fabric with the composition of claim 11, and heating the coating to at least 621° F., but below the decomposition temperature of the fabric.

13. The product of the process of claim 12.

14. The process which comprises bridging the interstices of a woven glass fabric with the composition of claim 11 and heating the coating to at least 621° F., but below the decomposition temperature of the fabric.

References Cited in the file of this patent

UNITED STATES PATENTS

| | | |
|---|---|---|
| 2,510,112 | Holbrook | June 6, 1950 |
| 2,562,118 | Osdal | July 24, 1951 |
| 2,613,193 | Osdal | Oct. 7, 1952 |

FOREIGN PATENTS

| | | |
|---|---|---|
| 487,234 | Canada | Oct. 14, 1952 |

OTHER REFERENCES

Soap and Sanitary Chemicals, August 1949, page 37 (Article by J. W. McCutcheon).